(12) United States Patent
Taki

(10) Patent No.: US 8,115,469 B2
(45) Date of Patent: Feb. 14, 2012

(54) DRIVER CIRCUIT

(75) Inventor: Konosuke Taki, Sendai (JP)

(73) Assignee: Freescale Semiconductor, Inc., Austin, TX (US)

( * ) Notice: Subject to any disclaimer, the term of this patent is extended or adjusted under 35 U.S.C. 154(b) by 111 days.

(21) Appl. No.: 12/757,041

(22) Filed: Apr. 9, 2010

(65) Prior Publication Data
US 2010/0277155 A1 Nov. 4, 2010

(30) Foreign Application Priority Data
May 1, 2009 (JP) .................................. 2009-112158

(51) Int. Cl.
*G05F 5/00* (2006.01)
(52) U.S. Cl. ....................................................... 323/299
(58) Field of Classification Search .................. 323/299; 327/108, 112, 587
See application file for complete search history.

(56) References Cited

U.S. PATENT DOCUMENTS

| | | | |
|---|---|---|---|
| 4,796,145 A * | 1/1989 | Oshikiri ..................... | 363/56.04 |
| 4,989,127 A * | 1/1991 | Wegener .................... | 363/56.04 |
| 5,367,210 A | 11/1994 | Lipp | |
| 5,397,967 A | 3/1995 | Carobolante | |
| 5,546,029 A | 8/1996 | Koke | |
| 6,353,345 B1 * | 3/2002 | Yushan et al. ................ | 327/112 |
| 6,678,180 B2 * | 1/2004 | Matsuda ....................... | 363/132 |
| 7,236,003 B2 * | 6/2007 | Chellamuthu et al. .......... | 326/14 |
| 7,626,429 B2 * | 12/2009 | Wu et al. ....................... | 327/112 |
| 7,635,998 B1 | 12/2009 | Taki | |
| 7,688,049 B2 * | 3/2010 | Iwabuchi et al. ............. | 323/271 |
| 2009/0027096 A1 | 1/2009 | Mourrier | |
| 2009/0134930 A1 * | 5/2009 | Tamura ......................... | 327/333 |
| 2010/0007399 A1 * | 1/2010 | Taki .............................. | 327/306 |
| 2010/0052774 A1 | 3/2010 | Boezen | |

FOREIGN PATENT DOCUMENTS

JP 2005-354586 A 12/2005

* cited by examiner

*Primary Examiner* — Jue Zhang
(74) *Attorney, Agent, or Firm* — Charles Bergere

(57) ABSTRACT

A driver circuit raises an output transistor signal smoothly while suppressing decreases in voltage. A motor driver includes a transistor connected to a buffer of a pre-driver. An external terminal of the motor driver is connected to a regulator to supply first and second transistors with voltage. The gates of the first and second transistors are connected to the drain of the other one of the first and second transistors. The first transistor is connected to a third transistor, which receives an input signal. The second transistor is connected to a fourth transistor, which receives the inverted input signal. The external terminal is connected to the gate of a further transistor. The further transistor has a source connected via a fifth transistor to a buffer, and a drain connected to the regulator.

6 Claims, 4 Drawing Sheets

DRIVER CIRCUIT

BACKGROUND OF THE INVENTION

The present invention relates to a driver circuit for driving a motor or the like.

Japanese Laid-Open Patent Publication No. 2005-354586 (page 1 and FIG. 1) describes a driver circuit for driving a motor or the like. Such a driver circuit may have a full or half bridge connection. The driver circuit of Japanese Laid-Open Patent Publication No. 2005-354586 lowers power consumption. In this publication, the driver circuit includes high and low side MOS transistors. A connection node between the high and low side MOS transistors serves as an output terminal of the driver circuit. The high side MOS transistor has a top gate connected to a pre-driver circuit. The pre-driver circuit includes an input terminal and a constant current source connected to the top gate. The pre-driver circuit drives the constant current source in accordance with the signal received by the input terminal. When the high side MOS transistor is activated, the voltage generated by the charge stored in a parasitic capacitance is added to the voltage at the connection node and applied to the top gate.

One type of a pre-driver circuit drives the high side transistor while monitoring the output voltage. When the gate-source withstand voltage of a high side transistor is low in a motor driver circuit, the source voltage must be monitored when applying a control voltage to the gate. Such a driver circuit DC1 will now be described with reference to FIGS. 3 and 4.

The driver circuit DC1 supplies power to a motor M1. The driver circuit DC1 includes a pre-driver 10 and a motor driver 11.

The motor driver 11 includes a high side transistor 111 and a low side transistor 112. The drain of the high side transistor 111 is supplied with voltage V1. The source of the high side transistor 111 is connected to the drain of the low side transistor 112. The source of the low side transistor 112 is connected to ground.

An external terminal TM1 is arranged at a connection node between the source of the high side transistor 111 and the drain of the low side transistor 112. Voltage V2 is supplied from the external terminal TM1 to the motor M1. The gate of the high side transistor 111 is supplied with a high side control voltage V5 from the pre-driver 10. The voltage V2 at the external terminal TM1 is fed back to the pre-driver 10 and used for voltage monitoring.

The pre-driver 10 includes buffers 12, 13, and 14, transistors 131 to 138, a resistor 15, and a regulator 16. The pre-driver 10 obtains an input signal S1, which controls the motor driver 11. An inverted signal S2 of the input signal S1 is provided to the buffer 13 and then to the gate of the transistor 112.

The regulator 16 obtains the voltage V2 via the resistor 15. The regulator 16 increases the voltage V2 to voltage V4, which is for driving the transistors 131 to 138. The gate of the transistor 131 is connected to the drain of the transistor 132. The gate of the transistor 132 is connected to the drain of the transistor 131. Further, the drains of the transistors 131 and 132 are respectively connected to the sources of the transistors 133 and 134. The drain of the transistor 132 is further connected to the input terminal of the buffer 12 to supply a converted voltage of the input signal S1. The gates of the transistors 133 and 134 are connected to the external terminal TM1 via the resistor 15. Further, the drains of the transistors 133 and 134 are respectively connected to the drains of the transistors 135 and 136. The gates of the transistors 135 and 136 are supplied with a voltage V3. The sources of the transistors 135 and 136 are respectively connected to the drains of the transistors 137 and 138.

The input signal S1, which is provided from an external device, is provided to the buffer 14, which is driven by the voltage V3, and the gate of the transistor 137. The buffer 14 provides the transistor 138 with an inverted signal of the input signal S1. The sources of the transistors 137 and 138 are connected to a ground line.

The operation of the driver circuit DC1 will now be discussed with reference to FIGS. 4A to 4B. Here, a simulation was performed by generating the input signal S1 and a load current I2. FIG. 4A is a timing chart of the input signal S1. The input signal S1 shifts to a high level at times t11 to t13 and t15 to t17. FIG. 4B illustrates the generation of the load current I2. When the load current I2 is positive, current is supplied from the driver circuit DC1 to the motor M1. When the load current I2 is negative, the motor M1 generates back electromotive force (EMF), which reverses the load current I2.

When the input signal S1 is high, the transistor 137 is activated, and the transistor 138 is deactivated. In this case, the source of the transistor 135 is at ground level. Thus, the transistor 135 is activated.

The transistors 133 and 134 form a clamp circuit, which protects the gates of the transistors 131 and 132. The source of the clamp circuit (i.e., the sources of the transistors 133 and 134) functions to keep the voltage above the sum of the voltage V2 and a threshold voltage Vt (voltage V2+threshold voltage Vt). Accordingly, the gate-source voltage at the gates of the transistors 131 and 132 does not exceed the maximum tolerable voltage (MaxVgs).

The transistors 135 and 136 form a clamp circuit that protects the transistors 137 and 138 by preventing the drain voltage of the transistors 137 and 138 from exceeding the voltage V3. The source of the clamp circuit (i.e., the sources of the transistors 135 and 136) functions to keep the voltage below the difference of the voltage V3 and the threshold voltage Vt (voltage V3−threshold voltage Vt). Accordingly, the drain-source voltage of the transistors 137 and 138 does not exceed the maximum tolerable voltage (MaxVgs).

When the voltage V2 is low, the voltage at the source of the transistor 133 (i.e., the gate of the transistor 132) is low. Thus, the transistor 132 is activated. In this case, the gate of the transistor 131 is supplied with the voltage V4 via the drain of the transistor 132. Thus, the transistor 131 is deactivated. Further, the voltage at the drain of the transistor 132 is supplied to the buffer 12.

The buffer 12 supplies the high side control voltage V5 to the gate of the transistor 111. This activates the transistor 111. As a result, the voltage V1 is supplied to the motor M1. As shown in FIG. 4C, the high side control voltage V5 rises after a relatively short time delay D11.

When the input signal S1 has a low level, the transistor 138 is activated, and the transistor 137 is deactivated. In this case, the source of the transistor 136 is at ground level. Thus, the transistor 136 is activated. In this state, the drain of the transistor 134 is at ground level, and the source is clamped at the sum of the voltage V2 and the threshold voltage Vt (voltage V2+threshold voltage Vt). Further, the drain of the transistor 132 becomes equal to the sum of the voltage V2 and the threshold voltage Vt (voltage V2+threshold voltage Vt), and the input terminal of the buffer 12 goes low. Accordingly, the high side control voltage V5 supplied to the gate of the transistor 111 also goes low. This deactivates the transistor 111 and stops the supply of voltage V1 to the motor M1. In this case, the voltage at the gate of the transistor 131 goes low, the transistor 131 is activated, and the transistor 132 is deactivated.

Back EMF may be generated in the motor M1 thereby reversing the flow of current from the motor M1. In FIG. 4A, the load current I2 is negative at time t15. In this case, current is supplied from the external terminal TM1. Most of the reversed current flows through a body diode of the transistor 111 but some of the reversed current is returned to the pre-driver 10.

The current is supplied to the buffer 12 and the regulator 16. In such a case, the buffer 12 can't output a high signal. Thus, the buffer 12 cannot supply the high side control voltage V5 in correspondence with the input signal S1. Further, when the back EMF and reversed current are eliminated, the voltage V2 goes low. This activates the transistors 133 and 134 and supplies the voltage corresponding to the input signal S1. Thus, after the EMF is eliminated and the load current I2 becomes positive as shown in FIG. 4B, the high side control voltage V5 rises following a relative long time delay D12 as shown in FIG. 4C.

In this case, when the back EMF is eliminated, the transistor 111 is not activated. Thus, the motor driver 11 cannot supply power. This produces a glitch G1 as shown in FIG. 4D. Then, the transistor 111 is activated, and the voltage V2 is recovered.

BRIEF DESCRIPTION OF THE DRAWINGS

The invention, together with objects and advantages thereof, may best be understood by reference to the following description of the presently preferred embodiments together with the accompanying drawings in which:

FIGS. 2A to 2D are timing charts showing the electrical characteristics of the driver circuit of FIG. 1, in which FIG. 2A shows a signal input to the driver circuit, FIG. 2B shows a load current of the driver circuit, FIG. 2C shows a high side control voltage output from a buffer, and FIG. 2D shows an output voltage of the driver circuit;

FIGS. 4A to 4D are timing charts showing the electrical characteristics of the conventional driver circuit of FIG. 3, in which FIG. 4A shows a signal input to the driver circuit, FIG. 4B shows a load current of the driver circuit, FIG. 4C shows a high side control voltage output from a buffer, and FIG. 4D shows an output voltage of the driver circuit.

DETAILED DESCRIPTION OF THE INVENTION

The present invention provides a driver circuit that allows for a signal of an output transistor to rise smoothly while suppressing voltage decreases.

One aspect of the present invention is a driver circuit including a driver output terminal arranged at a connection node of a high side transistor and a low side transistor. A floating power supply unit is connected to the output terminal to supply a floating voltage, which is obtained by increasing an output voltage. A buffer has an output terminal connected to a gate of the high side transistor and is operated by the floating voltage. A level shifter is supplied with the floating voltage. The level shifter supplies an input terminal of the buffer with a converted voltage obtained by converting a voltage of an input signal. An auxiliary transistor has a gate connected to the driver output terminal, a drain supplied with the floating voltage, and a source connected to the input terminal of the buffer. A control element connects the auxiliary transistor to a low potential line when the input signal has a low potential.

Other aspects and advantages of the present invention will become apparent from the following description, taken in conjunction with the accompanying drawings, illustrating by way of example the principles of the invention.

Figure 1:
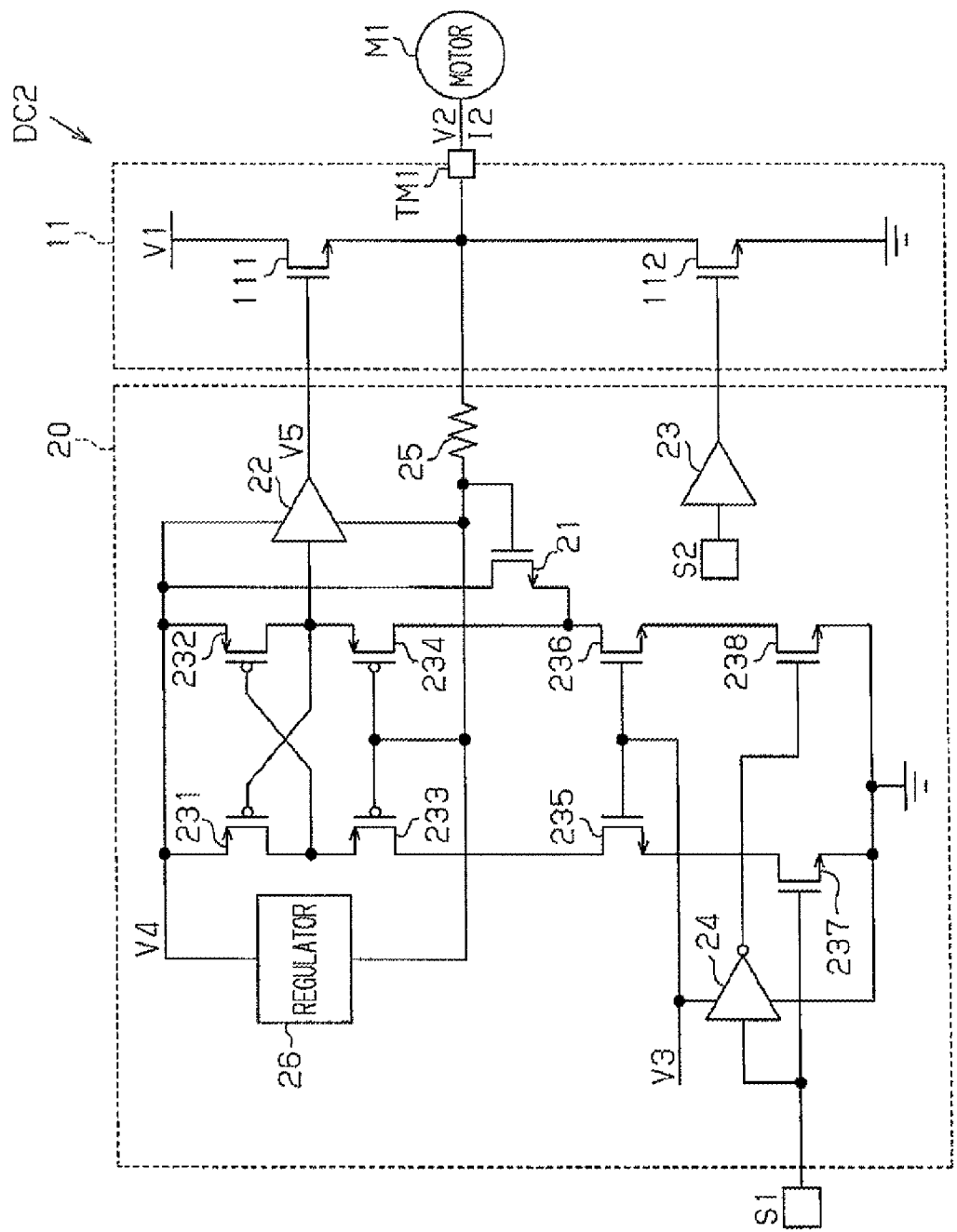
FIG. 1 is a schematic circuit diagram of a driver circuit according to one embodiment of the present invention.

A driver circuit DC2 according to one embodiment of the present invention will now be discussed with reference to FIGS. 1 and 2. In this embodiment, the driver circuit DC2 has a half bridge structure and supplies a motor M1 with power.

The driver circuit DC2 includes a motor driver 11 and a pre-driver 20, which supply the motor M1 with power. The motor driver 11 includes transistors 111 and 112, which are NMOS transistors in this embodiment. The transistor 111 functions as a high side transistor and the transistor 112 functions as a low side transistor.

The drain of the transistor 111 is supplied with voltage V1. The source of the transistor 111 is connected to the drain of the transistor 112. The source of the transistor 112 is connected to a low potential line (in the present embodiment, a ground line).

An external terminal TM1 (driver output terminal) is arranged at a connection node between the source of the transistor 111 and the drain of the transistor 112. Voltage V2 is supplied from the external terminal TM1 to the motor M1.

The gate of the transistor 111 is supplied with a high side control voltage V5 from the pre-driver 20. The voltage V2 at the external terminal TM1 is fed back to the pre-driver 20 and used for voltage monitoring. The gate of the transistor 112 is provided with a low side control signal via a buffer 23.

The pre-driver 20 controls both the high and low side transistors. The pre-driver 20 includes buffers 22, 23, and 24, transistors 231 to 238, a resistor 25, and a regulator 26. The transistors 231, 232, 233, and 234 are PMOS transistors, and the transistors 235, 236, 237, and 238 are NMOS transistors. The transistors 231 to 238 function as level shifters. The pre-driver 20 obtains an input signal S1 for controlling the motor driver 11. An inverted signal S2 of the input signal S1 is provided to the buffer 23.

The regulator 26, which functions as a floating power supply unit, obtains the voltage V2 via the resistor 25. Then, the regulator 26 increases the voltage V2 to voltage V4, which is a floating voltage supplied to drive the transistors 231 to 238. A supply line of the voltage V4 is connected to the sources of the transistor 231 (first transistor) and the transistor 232 (second transistor).

The gate of the transistor 231 is connected to the drain of the transistor 232. The gate of the transistor 232 is connected to the drain of the transistor 231. The drains of the transistors 231 and 232 are respectively connected to the sources of the transistor 233 (fifth transistor) and the transistor 234 (sixth transistor). The drain of the transistor 232 is further connected to the input terminal of the buffer 22 to supply a converted voltage of the input signal S1. The gates of the transistors 233 and 234 are connected to the external terminal TM1 via the resistor 25 and supplied with the voltage V2. The drains of the transistors 233 and 234 are respectively connected to the drains of the transistor 235 (seventh transistor) and the transistor 236 (eighth transistor). The gates of the transistors 235 and 236 are supplied with a voltage V3 (power supply voltage). The sources of the transistors 235 and 236 are respectively connected to the drains of the transistor 237 (third transistor) and the transistor 238 (fourth transistor).

The input signal S1, which is provided from an external device, is provided to the buffer 24, which is driven by the voltage V3, and the gate of the transistor 237. The buffer 24 provides the transistor 238 with an inverted signal of the input signal S1. The sources of the transistors 237 and 238 are connected to a ground line.

The pre-driver 20 further includes a transistor 21, which functions as an auxiliary transistor. The gate of the transistor 21 is connected to a connection node of the resistor 25 and the regulator 26. The drain of the transistor 21 is supplied with the voltage V4 from the regulator 26. The source of the transistor 21 is connected to the drains of the transistors 234 and 236.

Figure 2A:
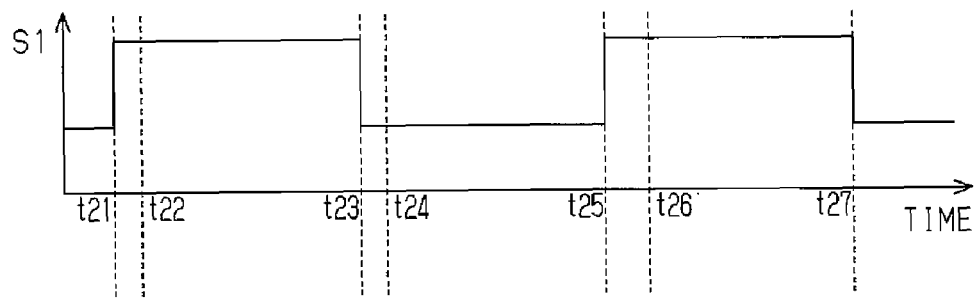
Figure 2B:
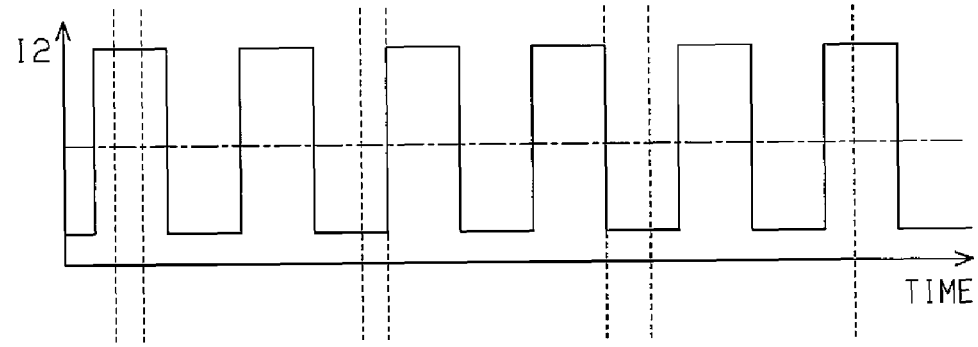

The operation of the driver circuit DC1 will now be discussed with reference to FIGS. 2A to 2B. Here, a simulation was performed by generating the input signal S1 and a load current I2. When the voltage V2 is low, the transistor 21 is deactivated. In this case, the same operations as the driver circuit of the prior art are performed.

When the motor M1 generates back EMF and the current reversed by the motor M1 increases the voltage V2, the transistor 21 is activated. When the input signal S1 has a low level, the transistor 238 is activated, and the voltage V4 has a ground level. In this state, the output of the buffer 23 has a high level. Thus, the transistor 112 is activated, and the external terminal TM1 is shifted to a low level.

When the input signal S1 has a high level, the transistor 238 is deactivated and the voltage V4 is supplied to the input terminal of the buffer 22 via the transistor 232. However, since the driving capability of the regulator 26 has been lowered by the reversed current from the motor M1, the transistor 232 cannot be immediately activated. Here, the transistor 21 is activated to supply the input terminal of the buffer 22 with the difference of the voltage V4 and a voltage Vf (voltage V4−voltage Vf) via a back diode of the transistor 234. The voltage Vf is a rising voltage of the back diode of the transistor 234. Accordingly, activation of the transistor 21 aids the activation of the transistor 232 and supplies the input terminal of the buffer 22 with the voltage V4 more quickly. This shifts the output of the buffer 22 to a high level.

Figure 2C:
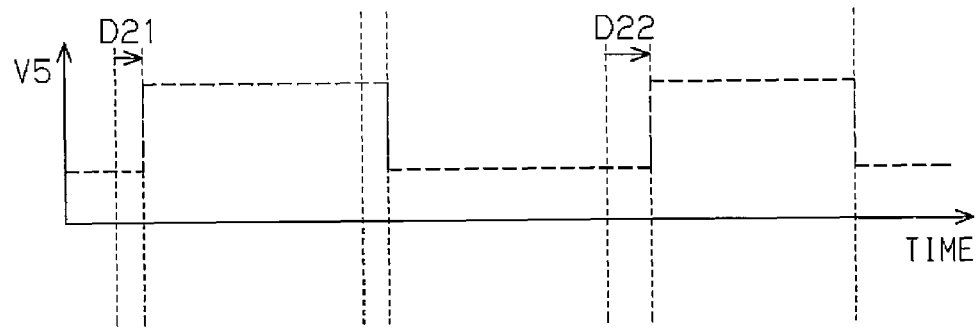
Figure 2D:
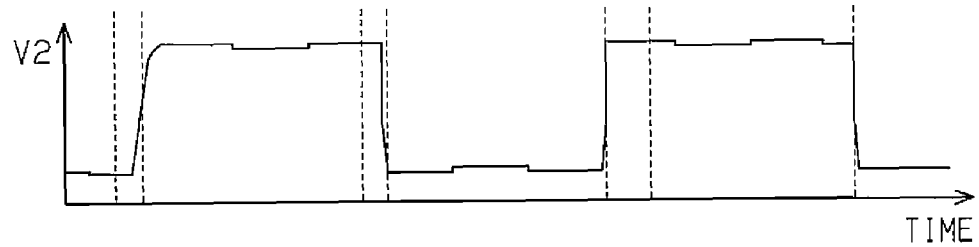
Figure 3:
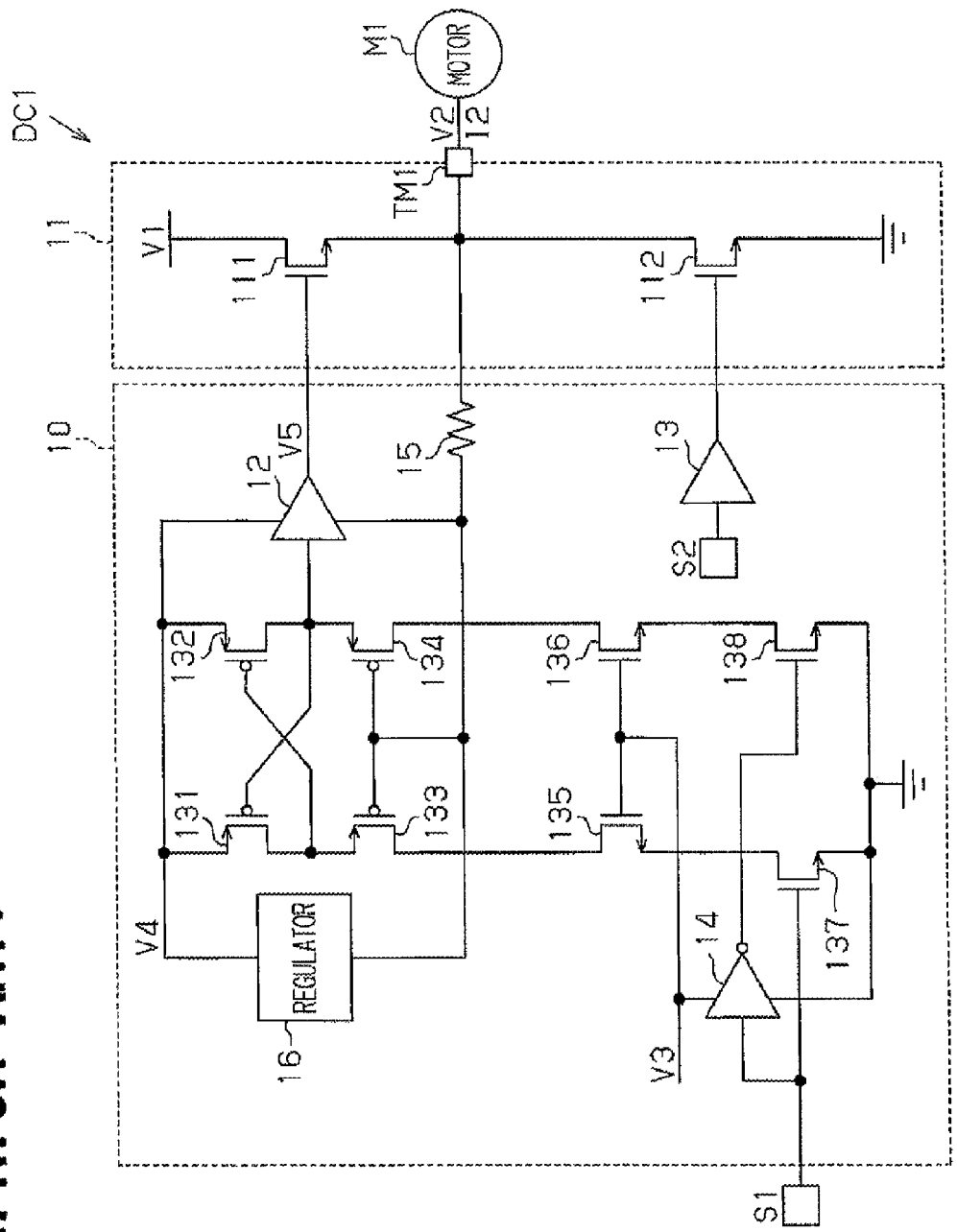
FIG. 3 is a schematic circuit diagram of a conventional driver circuit.
Figure 4A:
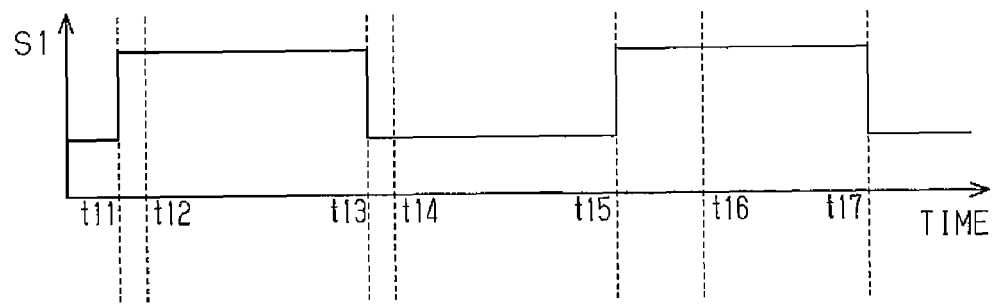
Figure 4B:
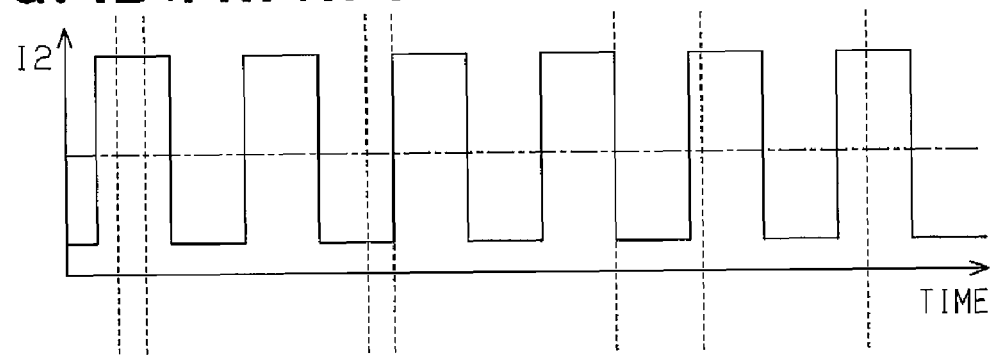
Figure 4C:
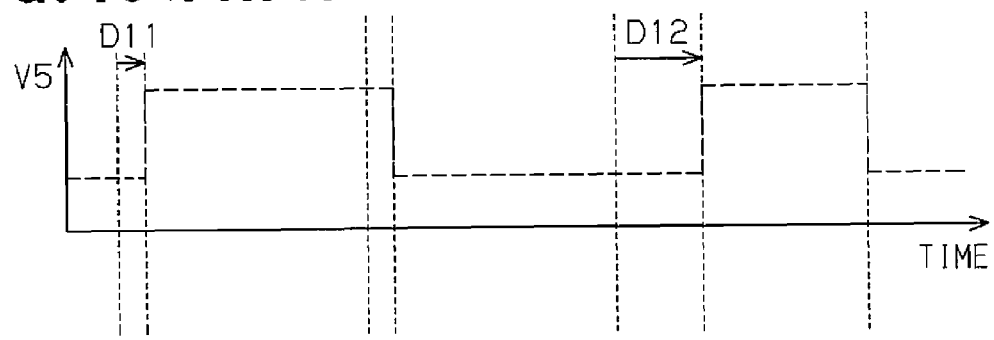
Figure 4D:
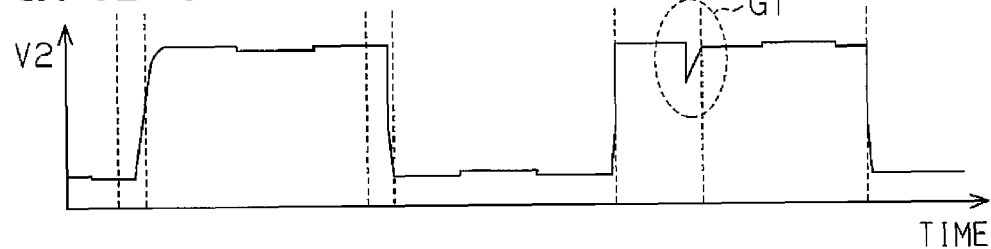

As a result, referring to FIG. 2C, a delay time D22 of when reversed current is generated is about the same as a delay time D21 of when there is no reversed current. Thus, the delay time D22 is small even when reversed current is being generated. Further, referring to FIG. 2D, when the reversed current is eliminated, the transistor 111 has already been activated. Thus, the voltage provided to the motor M1 rises smoothly; that is, no glitches are produced.

The driver circuit DC2 of the embodiment described above has the following advantages. The high side transistor 111 may be activated even when back EMF reverses the flow of current. Further, when the reversed current is eliminated, power may be supplied from the transistor 111. This suppresses glitches. It should be apparent to those skilled in the art that the present invention may be embodied in many other specific forms without departing from the spirit or scope of the invention. Particularly, it should be understood that the present invention may be embodied in the following forms.

The regulator 26 is used as the floating power supply unit. However, the present invention is not limited in such a manner and any circuit may be used in lieu of the regulator 26 as long as the output voltage may be increased and supplied as a floating voltage.

The driver circuit DC2 is applied to the motor M1. However, the present invention is not limited in such a manner, and the driver circuit DC2 may be applied to any current of which load current may be reversed.

PMOS transistors are used as the transistors 231 to 234 and NMOS transistors are used as the transistors 235 to 238. However, other types of control elements may be used instead. The present examples and embodiments are to be considered as illustrative and not restrictive, and the invention is not to be limited to the details given herein, but may be modified within the scope and equivalence of the appended claims.

What is claimed is:

1. A driver circuit comprising:
a driver output terminal arranged at a connection node between a high side transistor and a low side transistor;
a floating power supply unit connected to the output terminal to supply a floating voltage, which is obtained by increasing an output voltage;
a buffer having an output terminal connected to a gate of the high side transistor and operated by the floating voltage;
a level shifter supplied with the floating voltage, the level shifter supplying an input terminal of the buffer with a converted voltage obtained by converting a voltage of an input signal;
an auxiliary transistor having a gate connected to the driver output terminal, a drain supplied with the floating voltage, and a source connected to the input terminal of the buffer; and
a control element that connects the auxiliary transistor to a low potential line when the input signal has a low potential.

2. The driver circuit of claim 1, wherein the level shifter includes a first transistor and a second transistor, each having a source supplied with the floating voltage, wherein the first transistor has a gate connected to a drain of the second transistor, and the second transistor has a gate connected to a drain of the first transistor;
a third transistor and a fourth transistor, wherein the drains of the first and second transistors are respectively connected to drains of the third transistor and the fourth transistor;
the third and fourth transistors each have source connected to the low potential line;
the third transistor has a gate provided with the input signal; and
the fourth transistor has a gate provided with an inverted signal of the input signal.

3. The driver circuit of claim 2, wherein the drain of the auxiliary transistor is connected to the drain of the fourth transistor.

4. The driver circuit of claim 2, further comprising fifth and sixth transistors, wherein the drains of the first and second transistors are respectively connected to the drains of the third and fourth transistors via the fifth transistor and the sixth transistor; and
the fifth and sixth transistors each have a gate connected to the driver output terminal.

5. The driver circuit of claim 4, further comprising seventh and eighth transistors, wherein the drains of the first and second transistors are respectively connected to the drains of the third and fourth transistors via the seventh transistor and the eighth transistor; and
the gates of the seventh and eighth transistors are each supplied with power supply voltage.

6. A driver circuit for driving a motor, wherein the driver circuit receives an input signal, the driver circuit comprising:
a driver output terminal arranged at a connection node between a high side transistor and a low side transistor;
a floating power supply unit connected to the output terminal to supply a floating voltage thereto, wherein the floating voltage is generated by increasing an output voltage;

a first buffer having an output terminal connected to a gate of the high side transistor, wherein the first buffer is operated by the floating voltage;

a level shifter supplied with the floating voltage, wherein the level shifter supplies an input terminal of the first buffer with a converted voltage generated by converting a voltage of the input signal, wherein the level shifter includes first and second transistors, wherein sources of the first and second transistors receive the floating voltage, a gate of the first transistor is connected to a drain of the second transistor, and a drain of the first transistor is connected to a gate of the second transistor;

an auxiliary transistor having a gate connected to the driver output terminal by way of a resistor, and a drain supplied with the floating voltage;

an inverter that receives the input signal and generates an inverted input signal;

a control element that connects the auxiliary transistor to a low potential line when the input signal has a low potential, wherein the control element includes third and fourth transistors, wherein sources of the third and fourth transistors are connected to the low potential line, a drain of the third transistor is connected to the drain of the first transistor, a drain of the fourth transistor is connected to the drain of the second transistor, a gate of the third transistor receives the input signal, and a gate of the fourth transistor receives the inverted input signal;

fifth and sixth transistors, wherein a source of the fifth transistor is connected to a drain of the first transistor, a source of the sixth transistor is connected to a drain of the second transistor, and gates of the fifth and sixth transistors are connected to each other and to the gate of the auxiliary transistor; and seventh and eighth transistors, wherein a drain of the seventh transistor is connected to a drain of the fifth transistor, a drain of the eighth transistor is connected to a drain of the sixth transistor and a source of the auxiliary transistor, a source of the seventh transistor is connected to a drain of the third transistor, a source of the eighth transistor is connected to a drain of the fourth transistor, and gates of the seventh and eighth transistors are connected to each other and receive a power supply voltage.

* * * * *